United States Patent [19]

Miller

[11] Patent Number: 4,462,108

[45] Date of Patent: Jul. 24, 1984

[54] MODEM SIGNAL ACQUISITION TECHNIQUE

[75] Inventor: Chauncey S. Miller, Rancho Palos Verdes, Calif.

[73] Assignee: TRW Inc., Redondo Beach, Calif.

[21] Appl. No.: 404,194

[22] Filed: Aug. 2, 1982

[51] Int. Cl.³ .............................................. H03D 3/22
[52] U.S. Cl. ....................................... 375/97; 375/81; 328/155
[58] Field of Search ...................... 375/13, 14, 57, 58, 375/78, 80, 81, 86, 97, 99, 101, 113; 329/112, 122; 328/155, 162; 333/18; 455/164

[56] References Cited

U.S. PATENT DOCUMENTS

| | | | |
|---|---|---|---|
| 3,978,407 | 8/1976 | Forney, Jr. et al. | 375/39 |
| 4,004,226 | 1/1977 | Qureshi et al. | 375/13 |
| 4,079,329 | 3/1978 | England et al. | 375/81 |
| 4,317,210 | 2/1982 | Dekker et al. | 375/80 |

Primary Examiner—Robert L. Griffin
Assistant Examiner—Stephen Chin
Attorney, Agent, or Firm—Robert W. Keller; Noel F. Heal; Donald R. Nyhagen

[57] ABSTRACT

Apparatus, and a related method, for fast carrier acquisition in a modem. The apparatus includes circuitry to speed carrier acquisition by the determination of which of two alternate phasors is being received during a baud synchronization period of a signal preamble before data transmission. Another aspect of the invention involves the use of a complex matched filter for the determination of the start of an equalizer training sequence in the signal preamble. The output of the matched filter exhibits a deep null at the start of the training sequence, since the beginning of the sequence bears an inverse relationship to the end of the preceeding baud synchronization period.

6 Claims, 8 Drawing Figures

MODEM SIGNAL ACQUISITION TECHNIQUE

BACKGROUND OF THE INVENTION

This invention relates generally to digital modems, and, more particularly, to techniques for rapid modem carrier acquisition and synchronization. A modem, or modulator-demodulator, is a device widely used in the transmission of digital data signals over a telephone line or other communications link. At a transmitting end of the communications link, the modem modulates a high-frequency carrier signal in accordance with a specific modulation convention. Basically, the data signals to be transmitted are encoded as changes in frequency, amplitude or phase angle of the carrier signal. At the receiving end, another modem demodulates the carrier signal and reproduces the transmitted data.

Since the transmitting and receiving ends of the communications link are usually remote from each other, the receiving-end modem must be accurately synchronized with the incoming signal before it can be properly demodulated. Various synchronization and timing conventions have been developed, but this invention is concerned with modem operation in accordance with transmission conventions of the type established by a proposed United States federal standard, FED-STD-1007. This standard, which is widely followed by modem manufacturers, establishes a signal format for transmission at a rate of 9,600 bits per second, or 9.6 Kbps. The standard also defines a signal preamble format with which the present invention is principally concerned.

The preamble includes an AGC (automatic gain control) and baud synchronization period of 128 bauds, or 53 ms (milliseconds), followed by an equalizer training period of 384 bauds, or 160 ms. The baud synchronization period, as its name implies, allows the receiving-end modem to synchronize itself accurately to the baud rate of the incoming signal. The training period is used to "train" an adaptive equalizer in the receiving-end modem to respond properly to the incoming signals. During the training period, various parameters of the adaptive equalizer are adjusted to optimize its performance in the demodulation of the data-carrying signal that follows the preamble.

The present invention is concerned with two fundamental problems that arise in the operation of modems under a transmission standard of the same type as FED-STD-1007. The first problem relates to use of the standard in what is known as half-duplex mode. In this mode of operation, a single communications link is used for transmission in both directions, but not at the same time. The proposed standard was intended for use in transmitting relatively large amounts of data in one direction. If bi-directional transmission was a requirement, two transmission links would be used, one for each direction. However, the standard is also applicable to the transmission of relatively small amounts of data in alternate directions at high speeds.

One such application is in the transmission of digitized speech data in telephone communications. Use of digital signals for speech transmission facilitates the scrambling of the data for security purposes. Even where security is not a factor, digitized speech signals are more easily compressed, for better utilization of communications links, and more easily stored and switched from line to line in complex communications networks. While digitized speech signals can be conveniently transmitted in a "full-duplex" mode, using a separate communications link for each direction of transmission, a fifty-percent line cost saving is effected if the half-duplex mode can be used.

A practical limitation of half-duplex operation for the transmission of speech is the time that is required to "turn the line around," so that the sending-end modem begins operating as a receiving-end modem, and vice versa. If the time for resynchronizing the receiving-end modem is unduly long, an objectionable delay occurs between the talking and listening phases of a telephone conversation.

In accordance with the standard, signals are transmitted in a quadrature amplitude modulation (QAM) format, wherein both the amplitude and the relative phase angle of the carrier signal are modulated. In the baud synchronization part of the preamble, a sequence of two signal phasors is transmitted in alternation, the two phasors having different amplitudes and phase angles. At this synchronization stage, a typical receiving-end modem would have in operation at least three adaptive control loops, namely a phase-lock loop, an automatic gain control loop, and a baud synchronization control loop. Because of the alternate phase shifts and amplitude shifts of the incoming phasors, the three control loops tend to interact in an unfavorable manner and to slow the acquisition process. These conventional techniques result in unacceptable delays in the aquisition time during switching of the transmission direction in half-duplex mode.

The second major problem with respect to the federal standard is the timely detection of the start of the equalizer training period in the signal preamble. It is important for the receiving-end modem to be able to determine accurately when the baud synchronization interval of the preamble ends and the equalizer training interval begins. The simplest and most economical procedure for training the modem adaptive equalizer is to generate a required reference pattern in synchronism with the received training pattern. However, to do this requires an accurate knowledge of when the training period starts. Failure to obtain correct synchronization between the received training pattern and the locally generated reference pattern either degrades performance or requires a more complex and costly equalizer to make up for the resulting timing uncertainty. The only other alternative is to try several timing hypotheses in order to find the one that best matches the start of the training period. This also entails additional cost and complexity.

It will be appreciated from the foregoing that there has been a need for significant improvement in the area of modems for use with transmission standards of the same type as FED-STD-1007. In particular, what is required is a technique for reducing the baud synchronization time to such a degree that the transmission standard is acceptable for use in the transmission of speech in half-duplex mode. In addition, what is needed is a technique for the accurate detection of the start of the equalizer training period in the signal preamble prior to transmission of data. The present invention satisfies both these needs.

SUMMARY OF THE INVENTION

The present invention resides in a modem apparatus, and a corresponding method, for improving the speed of acquisition of an incoming signal in at least one of two important respects: baud synchronization; and detection of the start of the equalizer training period. In accordance with the invention, a receiving-end modem includes means for determining which of two alternate phasors is currently being received at the modem during a baud synchronization period, means for computing a phase error signal from the phase angle of the signal being received and the theoretical phase angle of the received phasor, and a phase-lock loop for computing from the phase error signal sine and cosine values for use in demodulating the incoming signals.

More specifically, the means for determining which of the phasors is being received includes an arctangent circuit, a delay circuit, and two subtractor circuits. The arctangent circuit computes the phase angle of the received phasor from a pair of complex coordinates. The phase angle, which includes an error signal component, is delayed by one baud interval in the delay circuit and applied in both delayed and undelayed form to one of the subtractor circuits. The resulting phase difference, representing the change in phase angle during the last baud interval, is next compared to a fixed angle, in the other subtractor circuit. If the result of subtracting the fixed angle from the phase difference is positive, a particular one of the two expected phasors is indicated, and if the result is negative the other one of the expected phasors is indicated. The indicated phasor angle is then subtracted from the originally computed angle derived from the arctangent circuit, and the result is the error signal component for application to the phase-lock loop.

In accordance with another aspect of the invention, a predictor circuit is coupled to the phase-lock loop, to compensate for time delays in the modem. The predictor circuit includes a time delay circuit providing a delay of approximately half of the time delay inherent in the adaptive equalizer of the modem.

Another important area of improvement that the invention provides is in the generation of a modem timing signal upon the detection of the start of the equalizer training period. In this regard, the apparatus of the invention includes training sequence detection means, for detecting the start of the equalizer training sequence within approximately one baud interval. The essence of the detection means is a complex matched filter coupled to receive complex phasor signals from the modem, and an envelope detector coupled to the output of the matched filter. Because the first seven bauds of the training sequence are equivalent to the inverse of the last seven bauds of the baud synchronization part of the signal preamble, the matched filter can be designed to exhibit a deep null in its output characteristic at the transition of the preamble to the training sequence.

The primary criterion for detection of the start of the training sequence is the falling of the matched filter output below a selected minimum threshold. This minimum threshold is determined by means of a second envelope detector, to which are applied the same signals that are input to the matched filter, and a low-pass filter coupled to receive signals from the second envelope detector. The low-pass filter provides a signal proportional to the average value of the demodulated signals, and this average is multiplied by a pre-selected factor to obtain the minimum threshold value. In other words the minimum threshold is a selected fraction of the average signal level.

Preferably, two other threshold tests are applied to the output of the matched filter to prevent false indications of the beginning of the training sequence. First, the matched filter output is delayed and smoothed, and compared with the product of the average signal level and another preselected factor. There can be no detected transition unless the delayed and smoothed output of the matched filter exceeds the product. Finally, the average signal level must itself be above a preselected fixed level in order for the transition to be detected. This precludes the possibility that electrical noise may trip the detection circuit when there is no signal present. The fixed threshold is set above the expected average noise level. The results of the three tests for the transition are ANDed together to produce the desired timing signal. Having the timing signal available greatly simplifies subsequent equalizer training, because there is then no uncertainty as to the correct synchronization of the training signals and a locally generated reference pattern.

The technique described for generating this modem timing signal has the advantage of detecting the start of the training sequence to within one baud interval. Moreover, the technique is practically independent of the characteristics of the communications channel, as well as of the phase and amplitude of the incoming signals.

It will be appreciated from the foregoing that the present invention represents a significant advance in the field of modems. In particular, the improved modem of the present invention includes apparatus for more rapidly acquiring an incoming signal by quickly identifying the received phasor during the baud synchronization period, and means for detecting the start of the equalizer training sequence to within one baud interval of its occurrence. Other aspects and advantages of the present invention will become apparent from the following more detailed description, taken in conjunction with the accompanying drawings.

DESCRIPTION OF THE PREFERRED EMBODIMENTS

As shown in the drawings for purposes of illustration, the present invention is principally concerned with improvements in modems. More particularly, the invention is concerned with the more rapid synchronization of the receiving-end modem with the incoming baud rate, and with the more timely detection of the start of an equalizer training sequence in the incoming signal.

Figure 4:
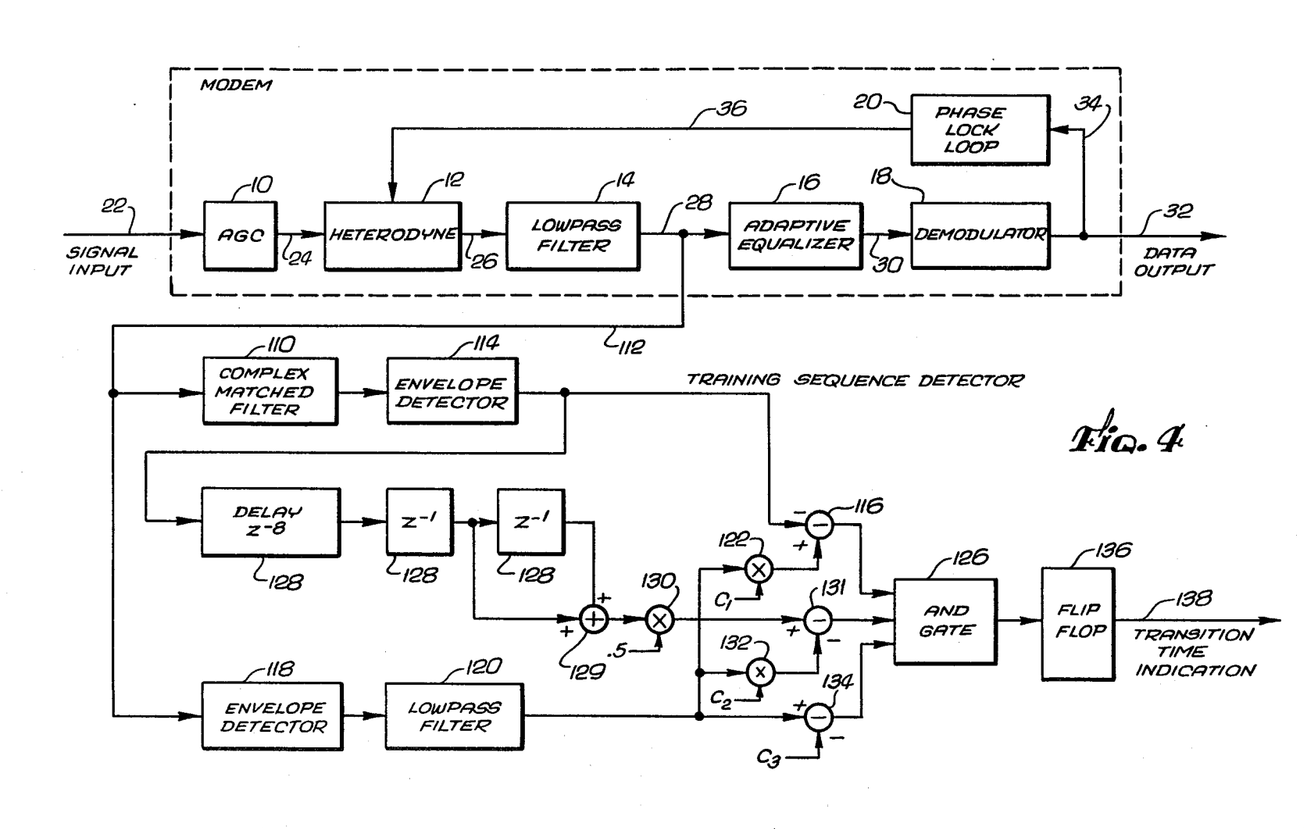
FIG. 4 is a block diagram of a receiving-end modem together with a training sequence detector in accordance with the invention.

By way of background, the upper portion of FIG. 4 illustrates the basic structure of a receiving-end modem. The structure includes an automatic gain control (AGC) circuit 10, a heterodyne circuit 12, a low-pass filter 14, an adaptive equalizer 16, a demodulator 18, and a phase-lock loop 20. An incoming signal is applied over line 22 to the AGC circuit 10, the output of which is applied over line 24 to the heterodyne circuit 12, which produces a baseband output signal on line 26. This output signal is low-pass filtered in the filter 14, and the filtered output on line 28 is passed to the adaptive equalizer 16, the output from which is transmitted over line 30 to the demodulator 18. Output data from the modem 18 is obtained on line 32. The phase-lock loop 20, in response to the timing of demodulated signals input on line 34, generates signals on line 36 to the heterodyne circuit 12, effectively locking the demodulation process to the carrier frequency of the incoming signal.

Figure 1:
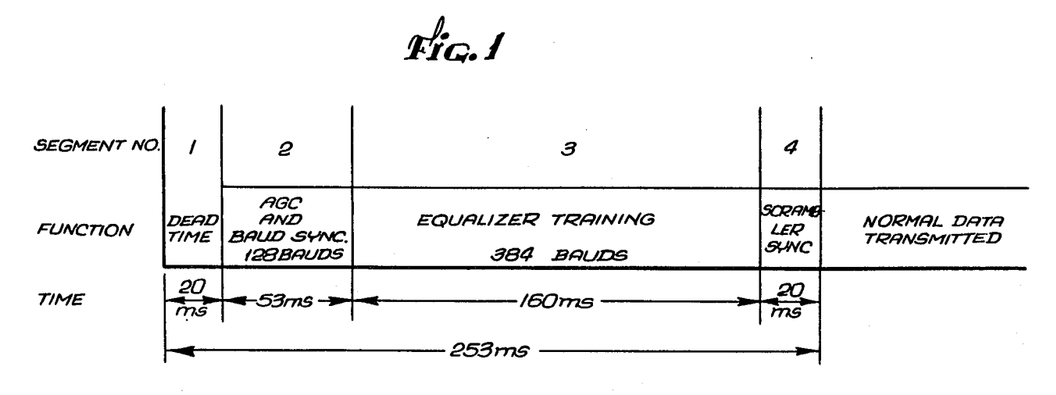
FIG. 1 is a timing diagram showing the various segments of a signal preamble associated with data transmission standard FED-STD-1007.

Before data can be transmitted and properly interpreted in the modem, a signal preamble is first transmitted, and used for purposes of synchronization and timing. FIG. 1 shows the format of a modem signal preamble in accordance with United States federal standard FED-STD-1007. It will be observed that the preamble includes a first segment of 20 milliseconds (ms) dead time, a second segment of 53 ms for AGC and baud synchronization, a third segment of 160 ms for equalizer training, and a fourth segment of 20 ms for scrambler synchronization. The present invention is concerned only with the second and third segments, for baud synchronization and equalizer training, respectively.

Figure 2A:
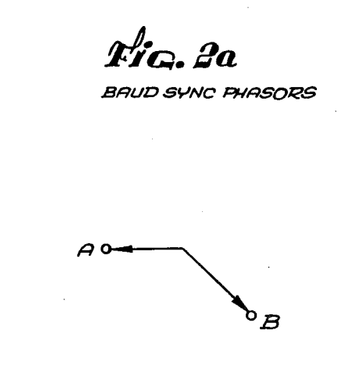
FIG. 2a is a phasor diagram showing the phasors transmitted during the baud synchronization segment of the preamble of FIG. 1.
Figure 2B:
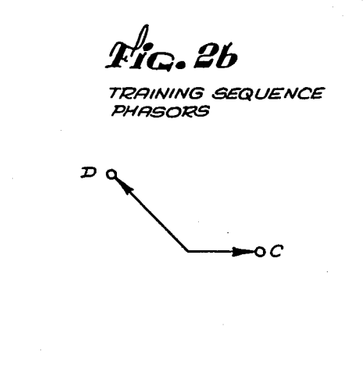
FIG. 2b is a phasor diagram showing the phasors transmitted during the equalizer training sequence of the preamble of FIG. 1.
Figure 2C:
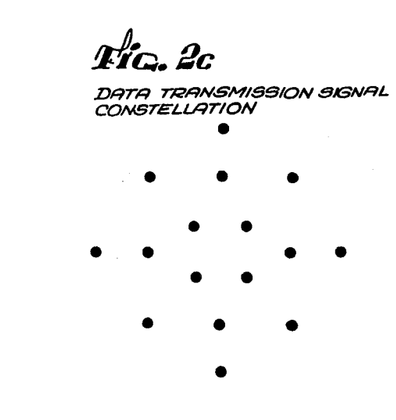
FIG. 2c is a phasor diagram showing the possible phasor positions used for transmission of data signals after the preamble of FIG. 2.

During baud synchronization, comprising 128 baud intervals, alternating phasors of the type shown at A and B in FIG. 2a are transmitted. Each phasor represents the amplitude and relative phase angle of the carrier signal during the baud interval in which it is transmitted. It will be seen that phasor A has an angle of 180 degrees and phasor B an angle of 315 degrees. In order for the modem to synchronize with the baud rate of the incoming signal, it must be rapidly responsive to the alternating sequence of A and B phasors. Unfortunately, the AGC circuit 10 and the phase-lock loop 20 tend to interact with the baud synchronization process and slow its completion. Slowness of baud rate synchronization is of little consequence in the transmission of large amounts of data in one direction, but is highly significant in other applications of modems, such as the transmission of digitized speech signals in half-duplex mode. In such cases, the acquisition time is extremely important, since an unduly long acquisition time will introduce an objectionable delay between transmitting and receiving data.

Figure 3:
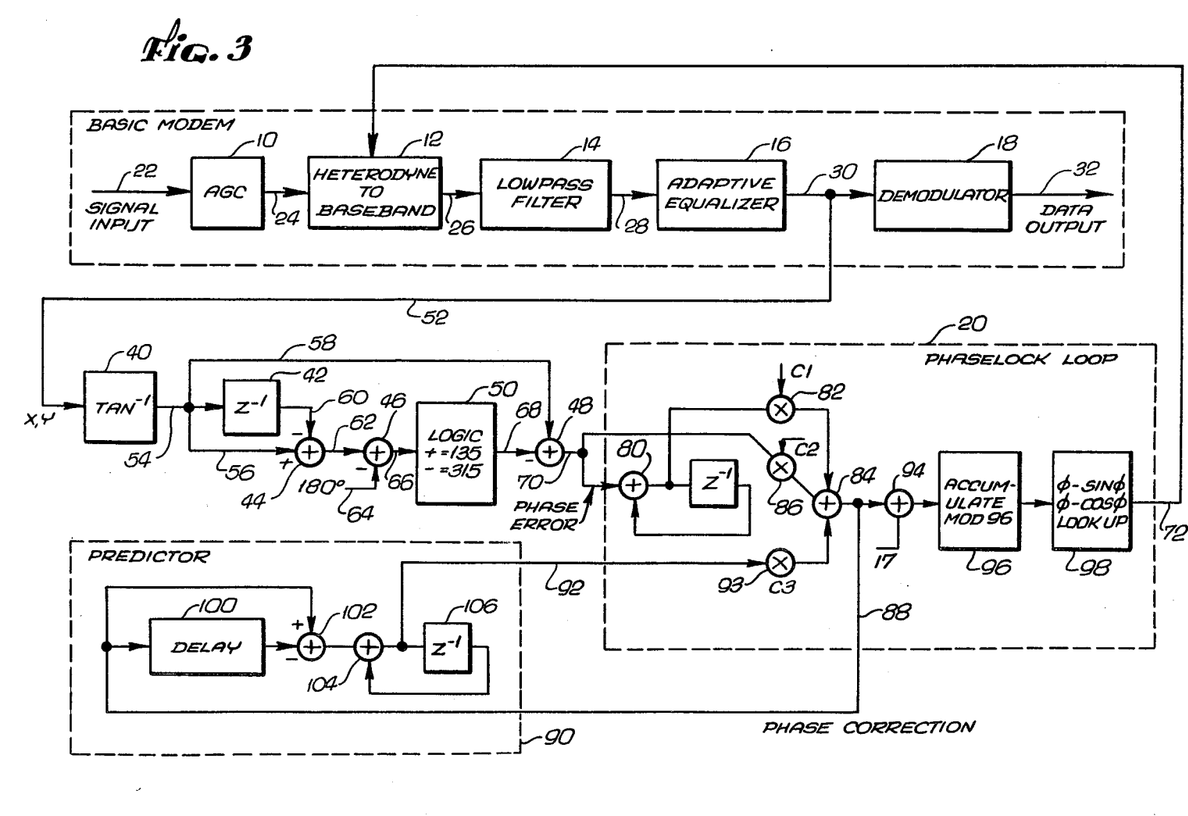
FIG. 3 is a block diagram of a receiving-end modem together with means connected to the modem, in accordance with the invention, for more rapid signal acquisition during the baud synchronization period of the signal preamble.

In accordance with one important aspect of the invention, and as shown in FIG. 3, means are provided for identifying which of the phasors A and B is currently being received at the modem. More specifically, the means for identifying the baud synchronization phasor includes an arctangent circuit 40, a baud interval delay circuit 42, three subtractor circuits 44, 46 and 48, and an additional logic circuit 50. A complex signal indicative of the current phasor position and magnitude is derived over line 52 from the adaptive equalizer and applied to the arctangent circuit 40, which yields the corresponding angle value on line 54 to the delay circuit 42. This angle value is also applied over line 56 to a positive input of subtractor circuit 44 and over line 58 to a positive input of subtractor circuit 48. The output of the delay circuit 42, on line 60, is applied as a negative input to the subtractor circuit 44, which operates to yield an equivalent positive result on line 62. Thus, if the result of the subtraction, which represents the change in phase angle from the previous baud interval to the present baud interval, is −135 degrees, for example, it is expressed as the equivalent positive value +225 degrees. In other words, the subtraction in subtractor 44 is performed on a modulo-360-degrees basis.

This positive phase angle difference is transmitted over line 62 to the second subtractor 46, the other input of which is a value of 180 degrees, as indicated at 64. The result on line 66 will be either positive or negative, depending on which of the phasors A or B is currently present. The logic 50 selects for output on line 68 either the angle 180 degrees of phasor A or the angle 315 degrees of phasor B. The selected value is subtracted from the actually received phase angle, in the third subtractor circuit 48, which yields an error signal on line 70 for application to the phase-lock loop 20.

By way of example, if the angle signal on line 54 is 180 degrees plus a small error component, then the previous angle on line 60 will be 315 degrees plus the error component. The result of the subtraction in subtractor 44 will be 225 degrees plus the error component. Subtraction of 180 degrees leaves a result of +45 degrees, again plus the error component indicating that phasor A is to be selected. If, instead, the angle signal on line 54 is approximately 315 degrees and that on line 60 is approximately 180 degrees, the result of the subtraction in subtractor 44 will be approximately 135 degrees. After subtraction of 180 degrees, this leaves a result of approximately −45 degrees, indicating that phasor B is to be selected.

The phase-lock loop 20 can be of any appropriate design, such as the one shown in detail in FIG. 3, yielding a set of sine and cosine signals on line 72 to the heterodyne circuit 12. The FIG. 3 phase-lock loop includes a first summing circuit 80 for summing the current error signal on line 70 and a delayed version of the output of the summing circuit. The output of the summing circuit 80 is multiplied by a parameter C1 in multiplier 82, and applied as an input to a second summing circuit 84. The error signal on line 70 is also multiplied by a parameter C2 in multiplier 86, and then input to the second summing circuit 84. The output of this summing circuit 84 is connected over line 88 to a predictor circuit 90. The predictor output is applied as a third input to the summing circuit 84, over line 92, after multiplication by a factor C3 in multiplier 93. The output of the second summing circuit 84 is increased by a constant in a third summing circuit 94, then applied to an accumulation circuit 96, and thence to a hook-up circuit 98 to obtain sine and cosine values for application to the heterodyne circuit 12.

The predictor circuit 90 is conventional in design, and includes a delay circuit 100, a subtractor circuit 102, a summing circuit 104, and a baud interval delay circuit 106. The input on line 88 is applied to the delay circuit 100 and positively to the subtractor 102, the negative input of which is derived from the output of the delay circuit 100. The output of the subtractor 102 is applied to the summing circuit 104, the output of which is in turn connected to output line 92 and to the baud interval delay 106. The delay 106 provides the second input for the summing circuit 104. The purpose of the predictor circuit 90 is to compensate for the relatively long time delays in the modem, particularly in the adaptive equalizer 16.

Figure 5:
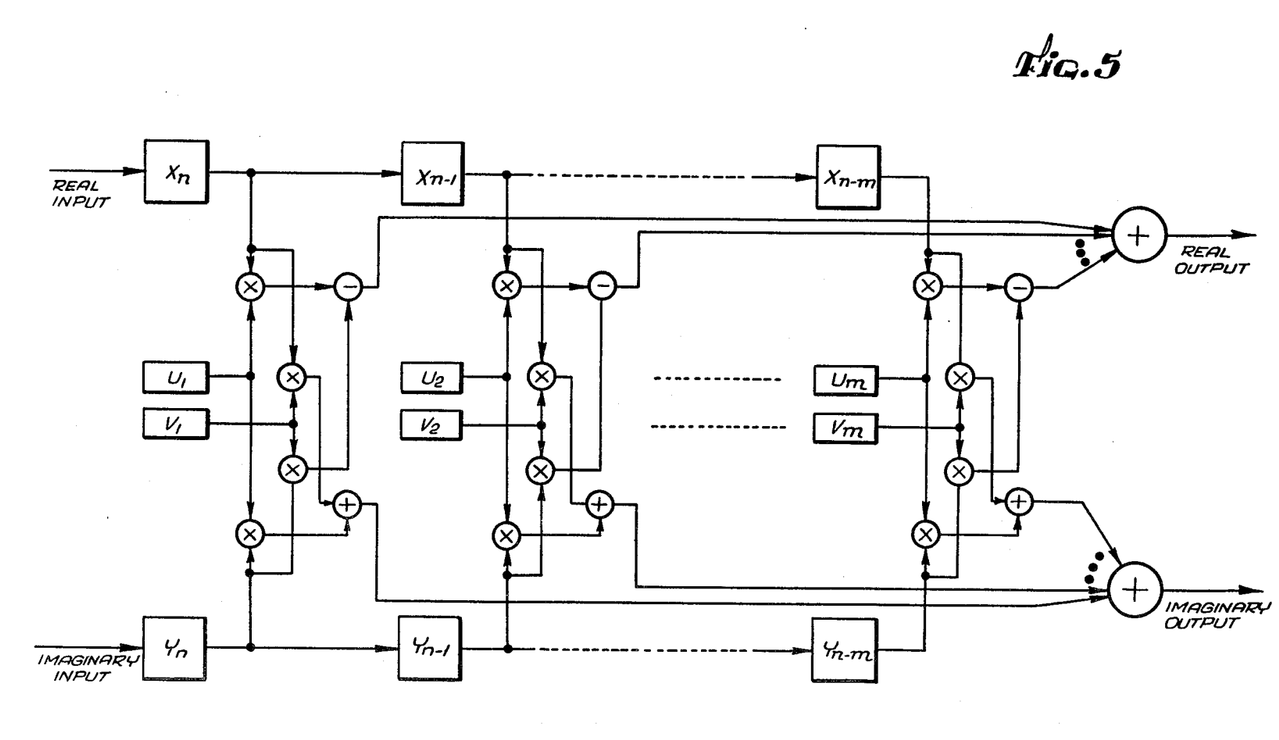
FIG. 5 is a block diagram of an exemplary complex matched filter for use in the training sequence detector of FIG. 4.
Figure 6:
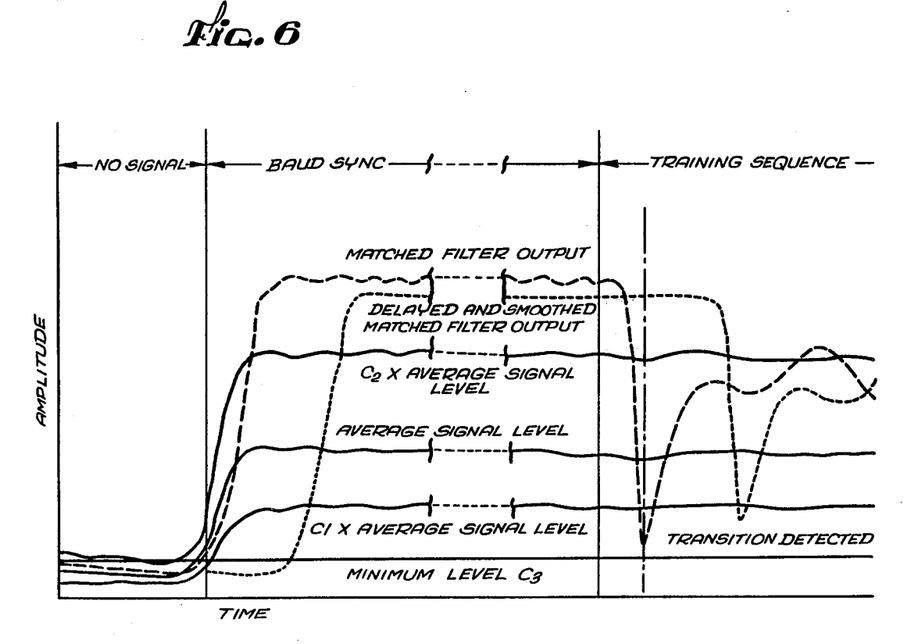
FIG. 6 is a graph showing the amplitudes of various signals in the training sequence detector of FIG. 4.

Detection of the start of the equalizer training sequence is the other principal aspect of this invention, as illustrated in FIGS. 4-6. As shown in FIG. 4, the essential element of the training sequence detector is a complex matched filter 110 having seven stages and designed to exhibit a sharp null in its output characteristic when the start of the training sequence occurs. The approach used in this aspect of the invention takes advantage of the fact that the first seven bauds of the training sequence are equivalent to the inverse of the last seven bauds of the baud synchronization period of the signal preamble.

The complex matched filter 110 may be implemented in any suitable form, one of which is shown in detail by way of example in FIG. 5. Basically, the matched filter is a shift register for input of a complex quantity $x+jy$. At each stage of the seven-stage filter, the complex quantity is multiplied by a complex factor $U+jV$. The real component of the output is derived from the sum of the real components of the multiplications at the several stages. Likewise, the imaginary component of the output is derived by summing the imaginary components of the multiplications at the several stages.

The matched filter input is derived over line 112 from the output of the low-pass filter 14 of the modem. The output of the matched filter 110 is passed through an envelope detector 114, and thence to a subtractor circuit 116. In parallel with the matched filter 110 is another envelope detector 118 and a low-pass filter 120, the purpose of which is to determine the average amplitude of the signal applied to the matched filter. To determine the start of the training sequence, the output of the matched filter 110 is compared with a fraction, such as 0.6, of the average signal level. The fraction used is determined by a parameter C1 applied to a multiplier 122, the result being applied to the other input of the subtractor 116.

The technique of detection of the transition between the baud synchronization period and the training sequence of the preamble can best be appreciated from FIG. 6. During the baud synchronization part of the preamble, the magnitude of the matched filter output builds up, and after seven bauds, reaches a steady state. The output fluctuates up and down with a small ripple as seven bauds contained in the matched filter shift register are alternately in phase and out of phase with the seven-baud reference. In practice, the amplitude of this ripple is reduced by the effect of the communications channel, which tends to smear the bauds together so that the received signal does not precisely match the reference.

When the baud synchronization part of the preamble ends and the equalizer training part begins, the signal modulation pattern exhibits a 180-degree phase shift, in accordance with the sequence of symbols prescribed by FED-STD-1007. When the phase reverses, the contribution from new bauds in the first stages of the matched filter shift register cancels the contribution from the bauds in the last stages of the matched filter shift register. As a result, the magnitude of the matched filter output drops rapidly as shown in FIG. 6. At the transition to the training sequence, the contributions attributable to the two sides of the transition cancel, and the matched filter output exhibits a deep null, falling below the threshold set by subtractor 116.

To prevent false indications of the transition, two other threshold tests are made, and the results are logically ANDed together, as indicated by AND gate 126. First, the output of the envelope detector 114 is delayed in the delay circuits 128, averaged with its value one baud interval earlier, as shown by the adder 129 and multiplier 130, and then applied to another subtractor circuit 131, together with the average signal level multiplied by a factor C2, as indicated by multiplier 132. The delayed form of the matched filter output, also shown graphically in FIG. 6, has to be greater than C2 times the average signal value for the transition to be detected. Finally, the average signal level is itself compared with a fixed minimum threshold level, indicated by C3, in yet another subtractor circuit 134. The threshold C3 is set above the expected noise level, to preclude the possibility that noise could trip the detection of transition when there was no input signal at all. Moreover, by tying the detection of transition to the average signal level, the detection circuitry is rendered responsive to changes in level rather than to absolute signal levels.

The output of the AND gate 126 is preferably used to latch a flip-flop 136, the output of which is used to provide the desired transition time indication, on line 138. The primary advantage of the technique is that it simplifies subsequent equalizer training by removing any uncertainty as to the correct synchronization between the signal and the reference sequence. In addition, the technique is reliable and accurate, providing a transition timing signal within one baud interval. Finally, the technique is not sensitive to characteristics of the communications channel, the amplitude of the signals, or the phase of the signals. Another advantage is that the technique is computationally efficient if the modem is implemented digitally. Transition detection needs to be performed only during the baud synchronization part of the preamble, thus allowing for full computational capability to be available during equalizer training, which is computationally intensive.

It will be appreciated from the foregoing description that the present invention represents a significant advance in the field of high-speed modems. In particular, the invention provides a technique for acquiring a received signal rapidly and shortening the acquisition time needed to operate effectively in a half-duplex mode. In addition, the invention provides a new technique for the detection of the start of an equalizer training sequence in the signal preamble that precedes the transmission of data. It will also be appreciated that, although specific embodiments of the invention have been described in detail for purposes of illustration, various modifications may be made without departing from the spirit and scope of the invention. Accordingly, the invention is not to be limited except as by the appended claims.

I claim:

1. For use in a receiving-end modem, apparatus for fast carrier acquisition, comprising:

means for determining which of two alternate phasors is currently being received at the modem during a baud synchronization period;

means for computing a phase error signal from the actual angle of the phasor being received and the expected angle of the phasor being received; and a phase-lock loop for computing, from the phase error signal, sine and cosine values for use in demodulating the carrier;

and wherein said means for determining which of the phasors is being received includes an arctangent circuit, for providing a signal indicative of the actual angle of the phasor being received;

a delay circuit for providing a signal indicative of the actual angle of the phasor received one baud interval earlier;

means for subtracting the signals indicative of the phase angle and delayed phase angle to obtain a phase angle difference signal;

means for subtracting one from the other of the phase angle difference signal and a signal indicative of a fixed angle, to obtain a second difference signal indicative of which of the two alternate phasors is currently being received; and means for generating from the second difference signal a signal indicative of the phase angle of a corresponding one of the two alternate phasors.

2. Apparatus as set forth in claim 1, wherein:

the two alternate phasors have angles of 180 degrees and 315 degrees;

the phase angle difference has one of the two possible values of approximately 135 degrees and approximately 225 degrees; and the fixed angle is 180 degrees, whereby said means for generating yields a result corresponding to approximately +45 degrees or approximately −45 degrees, depending on which phasor is being received.

3. Apparatus as set forth in claim 1, wherein said phase-lock loop includes a predictor circuit to compensate for time delays in the modem, and thereby stabilize operation of the apparatus.

4. For use in a receiving-end modem, a method for fast carrier acquisition, comprising the steps of:

determining which of two alternate phasors is currently being received at the modem during a baud synchronization period;

computing a phase error signal from the actual angle of the phasor being received and the expected angle of the phasor being received; and deriving from the phase error signal, sine and cosine values for use in demodulating the carrier;

and wherein said determining step includes generating in a arctangent circuit an angle signal indicative of the actual angle of the phasor being received;

delaying the signal generated in said generating step, to provide a delayed angle signal indicative of the actual phasor angle received one baud interval earlier;

subtracting the angle signal from the delayed angle signal to provide a phase angle difference signal;

subtracting one from the other of the phase angle difference signal and a signal indicative of a fixed angle, to obtain a second difference signal indicative of which of the two alternate phasors is currently being received; and generating from the second difference signal a signal indicative of the phase angle of a corresponding one of the two alternate phasors.

5. A method as set forth in claim 4, wherein:

the two alternate phasors have angles of 180 degrees and 315 degrees;

the phase angle difference has one of the two possible values of approximately 135 degrees and approximately 225 degrees; and the fixed angle is 180 degrees, whereby said step of generating from the second difference signal yields a result corresponding to approximately +45 degrees or approximately −45 degrees, depending on which phasor is being received.

6. A method as set forth in claim 4, wherein said step of deriving sine and cosine values is performed in a phase-lock loop and includes compensating for time delays in the modem.

* * * * *